Oct. 30, 1956     H. V. KINDSETH     2,768,657
STRANDED ENDLESS CONVEYORS
Original Filed Sept. 5, 1950     4 Sheets-Sheet 1
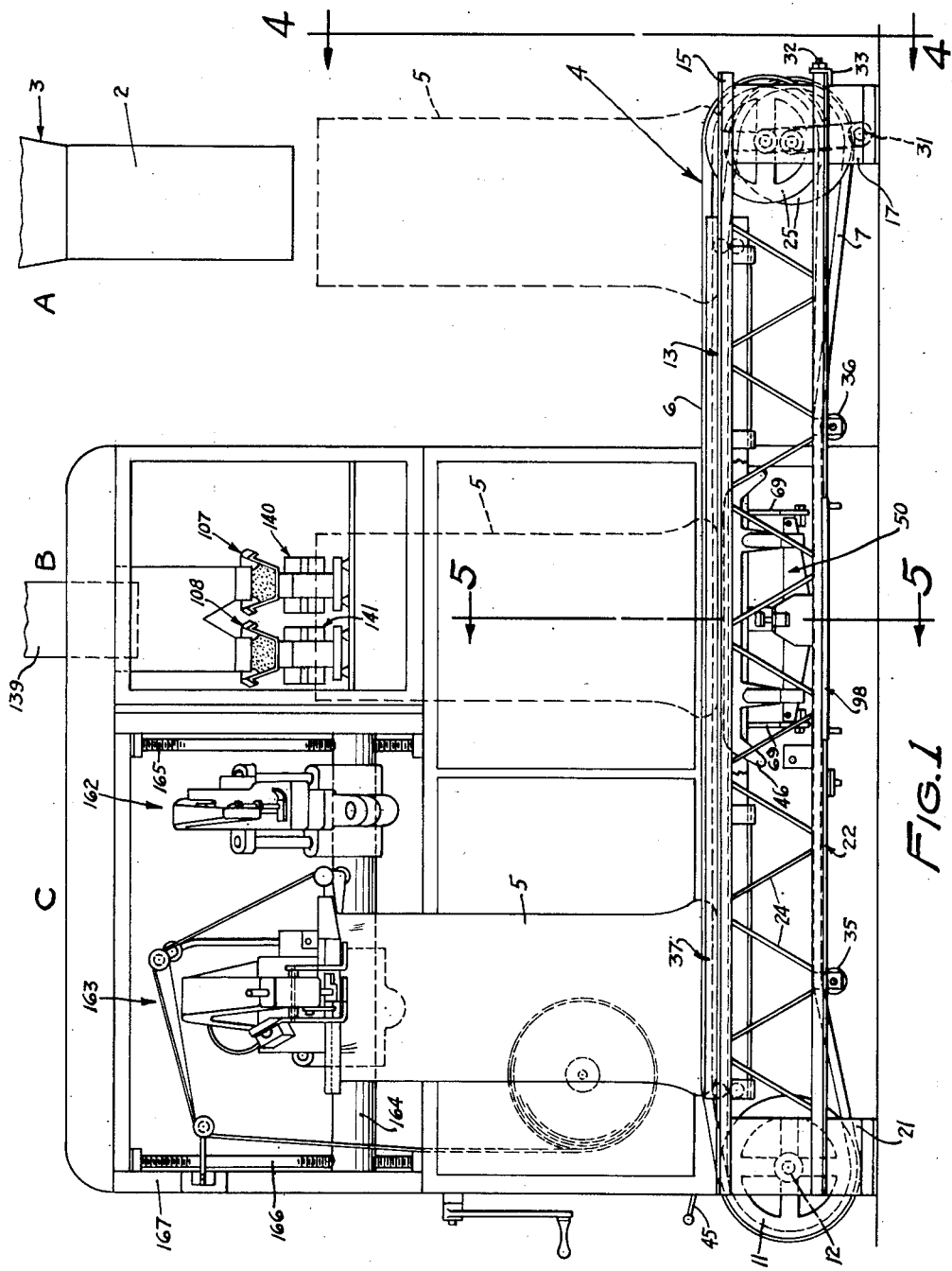
INVENTOR.
HAROLD V. KINDSETH
BY Paul, Moore & Rigger
ATTORNEYS

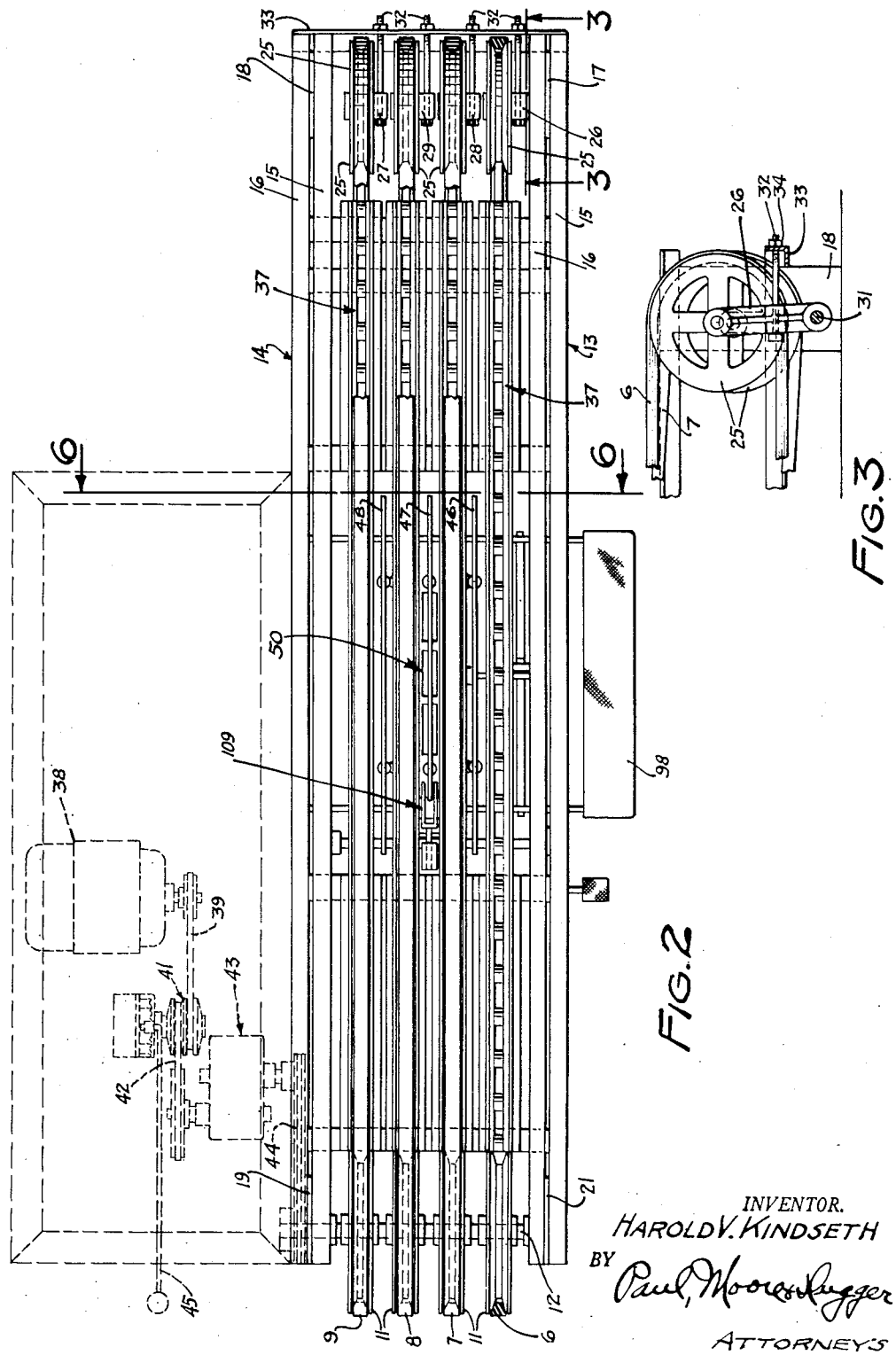

Oct. 30, 1956 H. V. KINDSETH 2,768,657
STRANDED ENDLESS CONVEYORS
Original Filed Sept. 5, 1950 4 Sheets-Sheet 3

INVENTOR.
HAROLD V. KINDSETH
BY Paul, Moore & Rugger
ATTORNEYS

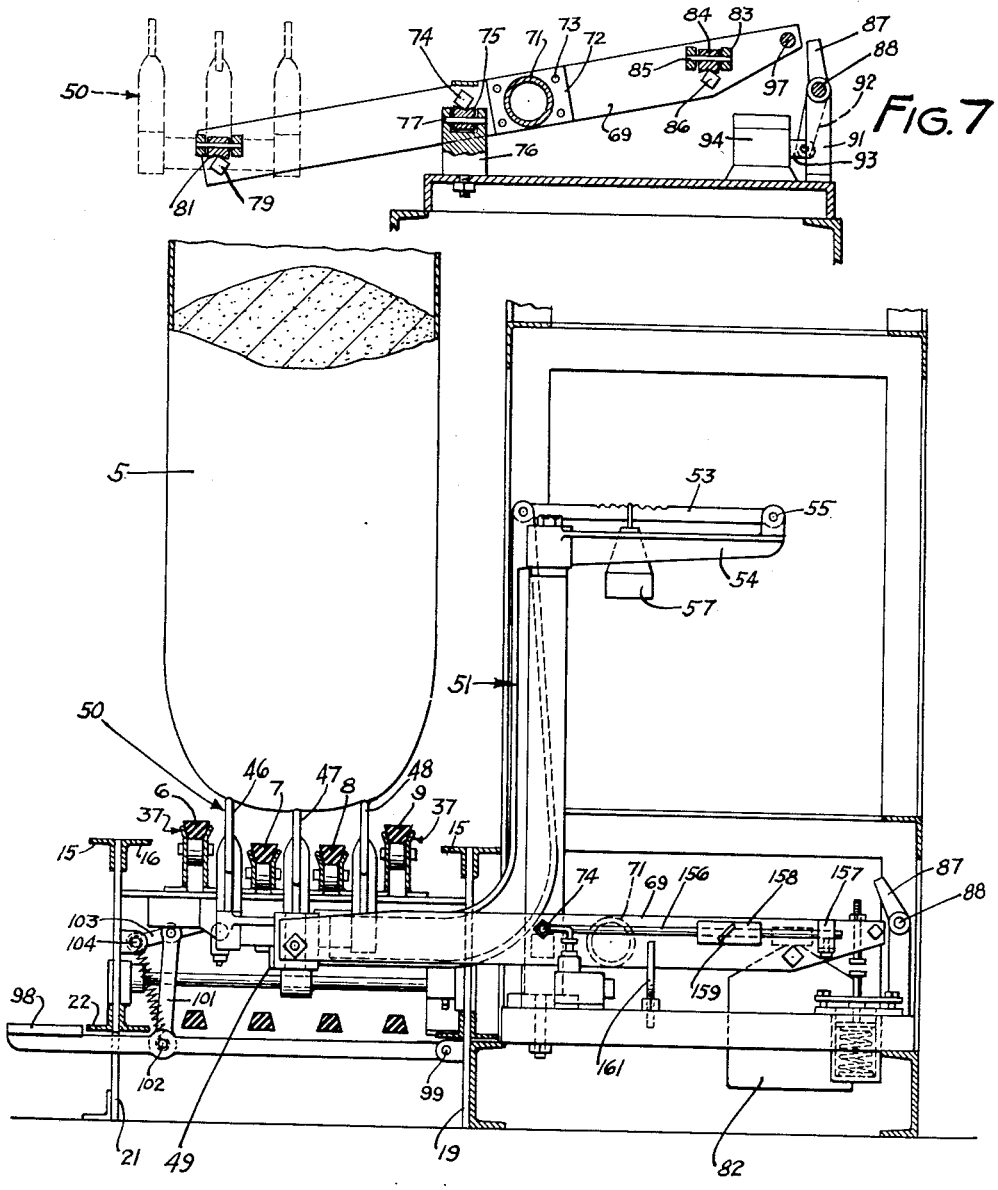

United States Patent Office 2,768,657
Patented Oct. 30, 1956

2,768,657

STRANDED ENDLESS CONVEYORS

Harold V. Kindseth, Minneapolis, Minn., assignor to Bemis Bro. Bag Company, Minneapolis, Minn., a corporation of Missouri Original application September 5, 1950, Serial No. 183,229. Divided and this application November 12, 1952, Serial No. 320,068

10 Claims. (Cl. 141—83)

This invention relates to new and useful improvements in stranded endless conveyors and more particularly relates to new and useful improvements in stranded endless conveyors of the type adapted to securely cradle a bag or other substantially round or V-bottom object thereon.

This application is a division of my application, Serial No. 183,229, filed September 5, 1950, and will be described with reference to the mechanism claimed in that application.

It is an object of this invention to provide an open bag transporting conveyor comprised of a plurality of V-belts disposed in spaced parallel relation and having their upper runs or strands cooperating to provide the load carrying surface of the belts;

A further object of the invention is to provide a conveyor for transporting bags from one station to the next, said conveyor being constructed of a plurality of V-belts disposed in closely spaced relation, and the load carrying runs of the belts constituting the outer marginal edges of the conveyor being disposed at a higher elevation than the inwardly disposed belt runs, the contour of the load carrying surface of the belt being, cross-sectionally, more or less of V- or U-shape, thereby to substantially fit the bottoms of the filled bag bodies and whereby the bags are not likely to relatively rotate on the conveyor when transported from one station to the next;

A further object of the invention is to provide a conveyor composed of a plurality of V-belts disposed in spaced parallel relation and the upper runs of which cooperate to provide the load carrying surface of the conveyor, and a vertically movable bag supporting cradle or member normally being positioned beneath the load carrying surface of said conveyor, and said cradle being elevatable into position to support the bottom of a bag and to accurately guide each bag onto the conveyor so that the seam usually provided at the bottom of each bag will be accurately aligned on the conveyor and will maintain this aligned position;

It is a further object of this invention to provide a receptacle transporting conveyor of a configuration designed to carry open receptacles, such as bags, in an upright position and to provide a conveyor which will prevent the tipping of the bags as they travel therealong;

It is still a further object of this invention to provide an endless conveyor designed to receive a bag and to maintain this bag in the same position as it is transported therealong;

It is still a further object of this invention to provide a transporting conveyor comprised of a plurality of V-belts having provision whereby accidentally spilled material from the bag falls through the carrying surface of the conveyor and is not carried along thereby;

Other objects of this invention reside in the construction of the guides for the upper runs of the V-belts;

Other and further objects of this invention are those inherent and apparent in the apparatus as illustrated, described and claimed.

This invention will be described with reference to the drawings in which corresponding numerals refer to the same parts and in which:

Figure 1 is a front elevational view of the bag filling and closing machine described in my divisional copending application, Serial No. 183,229, showing the conveyor for transporting bags therethrough;

Figure 2 is a plan view of Figure 1 with the bag filling and sealing structure omitted;

Figure 3 is a vertical sectional view taken along the line and in the direction of the arrows 3—3 of Figure 2;

Figure 6 is a vertical sectional view taken along the line and in the direction of the arrows 6—6 of Figure 2, showing the bag elevated from the conveyor by the cradle; and Figure 7 is a fragmentary vertical sectional view of the scale structure with the bag saddle indicated in dotted lines mounted on one end thereof.

Figure 4:
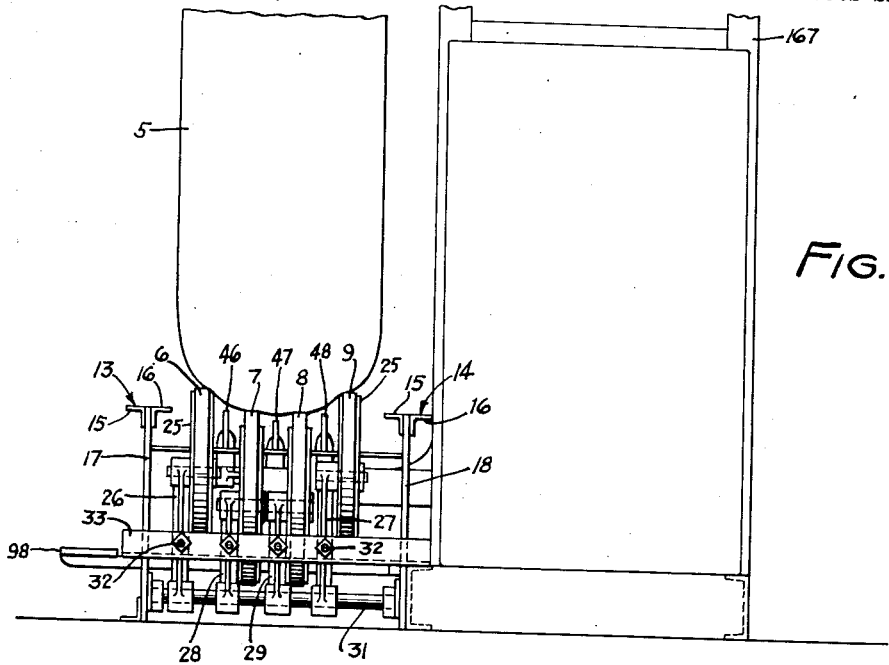
Figure 4 is a partial end elevation of the apparatus of Figure 1, showing a bag positioned on the conveyor.

Referring now to the drawings and specifically to Figure 1, there is shown a bag filling, weighing and sealing machine of my aforesaid divisional application together with the conveyor of this application. Thus, as illustrated in Figure 1, there is provided a conventional packer tube 2 of a conventional flour packer, generally designated by the numeral 3. The flour packer 3 constitutes no part of the present invention, and it is therefore deemed unnecessary herein to illustrate the packer in detail. The conveyor, generally designated by the numeral 4, has one end disposed beneath the packer tube 2 and is adapted to successively receive bags 5 from the packer tube, after each bag has received a charge of material which, as is well known in the art, is usually slightly underweight.

Figure 5:
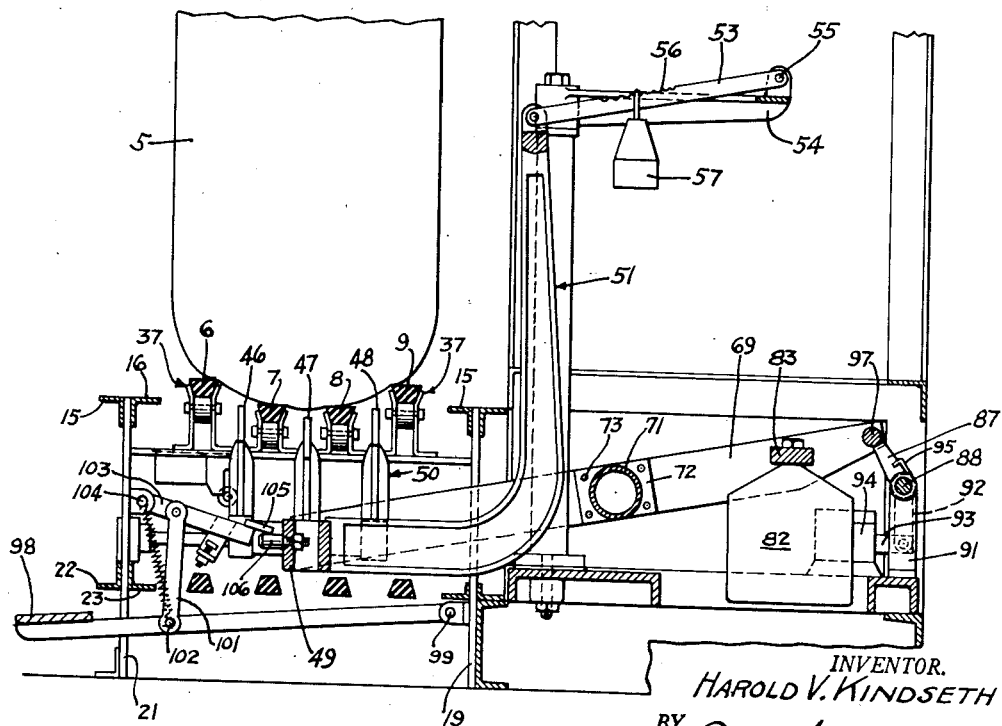
Figure 5 is a vertical sectional view taken on the line 5—5 of Figure 1.

The conveyor 4, as is illustrated best in Figure 2, is composed of a plurality of V-belts 6, 7, 8 and 9, disposed in spaced parallel relation with the upper runs of the intermediate belts 7 and 8, disposed at an elevation below the upper runs of the outer belts 6 and 9, whereby the four belt runs cooperate to provide, in effect, a conveyor whose bag carrying surface is substantially V or U-shaped in cross-section, as indicated in Figures 4, 5 and 6. The conveyor belts are supported at the discharge end of the conveyor by a plurality of flanged pulleys 11, as is best shown in Figure 2, secured to a shaft 12, mounted in suitable bearings provided in the supporting frame of the conveyor.

The conveyor supporting frame is shown comprising upper side rails 13 and 14 each composed of a pair of angle irons 15 and 16, arranged back-to-back, and having the upper ends of upright plate elements 17 and 18 secured therebetween at the receiving end of the conveyor. Similar plate elements 19 and 21 are interposed between the angle irons 15 and 16 at the discharge end of the conveyor. Auxiliary side rails 22 and 23, similar to the upper side rails 13 and 14, are secured to the upright plate elements 17, 18, 19 and 21, by suitable means such as welding. Diagonal braces 24 are shown having their upper ends interposed between the angle irons 15 and 16 of the upper side rails 13 and 14, and the lower ends of said braces are similarly disposed between and secured to the angle irons of the lower side rails 22 and 23, thereby to provide a very substantial supporting structure.

The V-belts 6 to 9 inclusive, are supported on idler pulleys 25 at the receiving end of the conveyor. The pulleys for the outer belts 6 and 9 of the conveyor are shown supported on arms 26 and 27, and the intermediate belts 7 and 8 are shown supported on relatively shorter arms 28 and 29. The arms are supported on a cross shaft 31, and are adapted for independent pivotal movement thereon by suitable adjusting rods or bolts 32. Each such bolt has one end secured to its respective pulley supporting arm and its opposite end being supported in a cross member 33. Adjusting nuts 34 are received in threaded engagement with the ends of rods 32, whereby the arms may conveniently be manipulated to maintain the belts under proper tension.

Transversely disposed rollers 35 and 36 are mounted on the lower side frame members 22 and 23 of the conveyor supporting frame to support the lower runs of the conveyor belts. The upper load carrying runs of the V-belts are shown supported in channel-like guides, generally designated by the numeral 37, having antifriction rollers constituting the bottoms thereof to minimize friction between the load carrying runs of the V-belts and the supporting frame.

Means for driving the conveyor is best illustrated in Figure 2, and comprises a motor 38 having a belt drive 39 connecting it to a conventional clutch-type pulley 41. Pulley 41, comprises, in effect, dual pulleys for receiving the belt 39 and a similar belt 42 which operatively connects the drive pulley 41 to the high speed shaft of a conventional speed reducer, generally designated by numeral 43. The low speed shaft of the speed reducer is shown having a chain drive 44 connecting it to the driven shaft 12 of the conveyor. The clutch 41 is operable to vary the speed of the conveyor by manipulation of a suitable control lever 45, as shown best in Figure 2.

As stated previously, this conveyor is described with reference to the material packing machine of my copending application, Ser. No. 183,229. In the operation of a material packing machine of the general character therein disclosed, it is customary to so adjust or set the packer that it will deliver a short-weight charge or load into each bag. The underweight bag is then delivered onto a weighing platform where additional material is delivered into each bag to bring the bag up to full measure or weight.

The weighing platform herein disclosed, generally designated by the numeral 50, is of the weight-operated type, and comprises a plurality of spaced parallel bars 46, 47 and 48, secured to a supporting frame 49. An L-shaped arm 51 has the forward end of its lower horizontal portion fixedly secured to the frame 49 of the weighing platform 50, by suitable means. The upper end of said arm is pivotally connected to one end of an auxiliary scale beam 53, having its opposite end pivoted to a fixed support 54 by a pin 55. The upper edge of the auxiliary scale beam 53 is preferably serrated, as indicated at 56, to retain a suitable balance weight 57 in adjusted position thereon. The scale beam 53 may be provided with suitable indicia, as is customary in devices of this character.

The auxiliary scale beam 53 and weight 57 provide means for accurately balancing the weighing platform 50, should said platform be slightly out of balance because of inaccuracies in the construction and assemblage of the various parts of the apparatus.

The main supporting means for the scale platform 50 is shown comprising a pair of spaced apart scale beams 69 secured together in spaced relation by a tubular member 71 provided with flanged ends 72 to which the scale beams 69 are secured by suitable means such as bolts 73.

The scale beams 69 are mounted for pivotal movement, as will be understood by reference to Figures 5 and 7. To thus support the scale beams 69, studs 74, preferably square in cross-section, but not necessarily, are secured to the intermediate portions of the scale beams 69, and are so disposed thereon that opposed corners of each stud are located in a plane disposed at right angles to the length of the scale beams. By so arranging the studs 74, the lower corner of each stud serves as a knife edge about which the composite scale beam may freely pivot. V-shaped blocks 75 are shown pivotally supported in upright brackets 76 by pivots 77, and provide self-aligning supports for the pivot studs 74 of the scale beams.

Similar knife edge studs 79 are secured to the forward ends of the scale beam 69 for pivotally supporting the weighing platform 50 thereon, as indicated in full and dotted lines in Figure 7. V-shaped blocks 81, similar to the blocks 75, are pivotally mounted on the scale platform and cooperate with the studs 79 to provide knife edge supports.

To counterbalance the weight of the weighing platform 50 and the underweight bag supported thereon, a counterweight 82 is shown suspended from a supporting bar 83 having its opposed ends forked to receive V-blocks 84, similar to the blocks 75 and 81. The blocks 84 are pivotally secured in the forked ends of the supporting bar 83 by pivot pins 85. Knife edged studs 86 are secured in the rear end portions of the scale beams 69 adapted to be engaged by the pivot blocks 84, thereby to pivotally support the supporting bar 83 on the rear end portions of the scale beams 69, and whereby the weight of the counterweight 82 is transmitted to the scale beams 69 and constantly tends to urge the scale platform upwardly to the position shown in Figure 6.

Means is provided for locking the weighing platform 50 in depressed position, and is shown comprising a latch 87 secured to a rockshaft 88 mounted in brackets secured to the frame portion 78 of the machine frame, as best shown in Figure 5. A depending arm 92 is also secured to the rockshaft 88 and has its lower end pivotally connected to the armature 93 of a solenoid 94, as illustrated in Figures 5 and 7. A spring 95 is coiled around shaft 88 and has one end fixed to the bracket 91 and its opposite end engaging the latch member 87, whereby spring 95 constantly urges the latch 87 in a direction to engage a cross rod 97 secured to the rear ends of the scale beams 69, as clearly illustrated in Figures 5 and 7. The spring 95 causes the latch 87 to automatically secure the scale platform in depressed position as shown in Figure 5, when the solenoid is de-energized and the operator manually depresses the scale platform, as will next be described.

The control means includes a foot pedal 98 which is manually operable to transfer the completely filled bag onto the conveyor from the weighing platform, when it has received its full charge.

The foot pedal 98 provided for thus manually depressing the scale platform is shown pivoted at one end to the main frame of the machine by a pivot pin 99, as shown in Figure 5. One end of a link 101 is pivoted to the foot pedal 98 by a pivot 102, and the opposite end of said link is pivoted to an intermediate portion of an arm 103 pivoted at 104 to the conveyor frame. The opposite swingable end of the arm 103 has an element 105 secured thereto adapted to engage a stud 106 fixed to the frame 49 of the weighing platform 50, whereby when the foot pedal is manually depressed, the weighing platform is correspondingly depressed below the surfaces of the multiple strands of the conveyor, as shown in Figure 5.

Means is provided for automatically actuating the scale to elevate each underweight bag 5 to a position above the conveyor, when each bag passes from station A to station B, whereby the bags successively come to rest beneath a pair of small vibratory troughs 107 and 108, indicated in Figure 1.

To thus cause the scale platform to automatically elevate the bag to a position above the conveyor at station B, a trip switch, generally designated by the numeral 109, is positioned in the path of the advancing bags, as shown in Figure 2, it being understood that the weighing platform is in its depressed position beneath the surface of the conveyor, as the bag advances along the conveyor. When the lower leading corner of the bag body engages switch 109, it actuates solenoid 94 to effect the automatic release of the scale platform, whereby the counterweight 82 overbalances the weight of the underweight bag, and thus drops to the position shown in Figure 6, whereby the underweight bag is moved out of contact with the conveyor, and temporarily is supported directly upon the scale platform 50 directly beneath the vibratory troughs 107 and 108. This is fully explained in my co-pending application above referred to.

As shown best in Figure 1, the underweight bag is brought up to full weight on the weighing platform, subsequently released to the conveyor and transferred to a bag top closing means. Vibrating troughs 107 and 108 serve to introduce the additional material into each underweight bag to bring the weight of its contents up to full measure before the filled bag is passed on to the bag top closing mechanism, indicated at C. These troughs form a check weigher of conventional construction and it is therefore believed unnecessary herein to describe the same in detail.

Briefly, the check weigher comprises the troughs 107 and 108 which, for illustrative purposes, are shown connected to a hopper 139 from which they receive the material to be delivered into each underweight bag. As is well known, the troughs 107 and 108 are actuated by suitable vibrating mechanisms, generally designated by the numerals 140 and 141, which impart a vibratory action to each trough to cause the material to trickle slowly therefrom into the open mouth of the bag positioned on the scale platform therebeneath, until the weight of its contents is brought up to full measure.

The operations of the vibratory troughs 107 and 108 of the check weigher are electrically controlled by switches, not shown. The movable contacts of said switches are adapted to be actuated when the scale beams 69 are in the position shown in Figure 5, to interrupt the flow of current to the check weigher. When the scale beams are released from the latch 87 as a result of an underweight bag advancing from station A to station B, and effects energization of the solenoid 94, the counterweight 82 drops by gravity to the position shown in Figure 6, whereby a circuit is completed to the check weigher which effects automatic operation thereof to deliver material into the bag.

As the scale beam and bag gradually settle to a balanced condition upon the introduction of the necessary additional material into the underweight bag, the operation of the check weigher is interrupted, whereby delivery of material into the bag from the vibratory troughs 107 and 108 is cut off.

Means is provided for causing the scale beams and weight 82 to more readily start their upward movement, as additional material is delivered into the bag supported on the scale platform by the check weigher. Such means is shown comprising a rod 156 having one end pivoted to one of the knife edge studs 74 of the scale beams. This stud, it will be noted by reference to Figure 6, is extended outwardly beyond the adjacent scale beam 69 to provide a pivotal support for the adjacent end of the rod 156. A keeper 157 is secured to the outer end of the adjacent scale beam 69 for supporting the opposite end of the rod 156 on the scale beam, when the scale beam assumes its balanced or an upper position, as shown in Figure 6.

A weight 158 is slidably supported on the rod 156 and has a lock screw 159 for securing it in adjust position. A stud 161 is shown secured to the frame of the machine and extends upwardly to provide a support for the rod 156 and weight 158, when the scale beams are in their lowered positions. In other words, when the scale beams descend to their lowered positions, the rod 156 will engage the top of the post 161 whereby the free end of the rod is moved out of keeper 157, and substantially the entire weight of the rod 156 and weight 158 is then transferred onto the fixed post 161. When the rear end of the scale beams ascend to a balanced position, as shown in Figure 6, the keeper 157 will pick up the free end of the rod, whereby the combined weight of said rod and its sliding weight 158 become in effect, a portion of the main counterbalancing weight required to balance the scale platform.

The bag top closing means is shown comprising two independent sewing units 162 and 163, shown adjustably mounted upon a tubular supporting member 164 supported on upright threaded rods 165 and 166, rotatably supported in the upper frame structure 167 of the machine frame, as indicated in Figure 1. These units are explained in detail in my aforesaid co-pending application, and it is therefore deemed unnecessary to describe them herein as they form no part of the present invention per se.

To complete the operation of filling and closing the bags, each underweight bag when reaching station B from station A, actuates trip lever 109 which energizes solenoid 94 to release the latch 87 and the scale beams 69. Release of the scale beams from the latch causes the counterweight 82 to descend to its lowermost position, whereby the weighing platform 50 moves into engagement with the bag bottom and lifts the underweight bag out of engagement with the moving conveyor belt to the position shown in Figure 6.

Simultaneously, the circuit to the check weigher is automatically closed, whereby a vibratory action is imparted to the troughs 107 and 108 thereof to cause them to deliver the necessary additional material into the open bag top to bring the weight of the contents of the bag up to the required full measure. As the bag, counterweight 82, and scale beams 69 gradually settle to a balanced condition, the check weigher is cut off. This is effected when the bag descends to the position shown in Figure 6, in which position the filled bag and the scale beams come to rest in a balanced condition. Should the parts be slightly out of balance, the auxiliary weight 57 may be shifted upon the scale beam 53 to compensate for any defects which may cause such unbalance of the scale beam.

If paper bags are to be filled and closed, which require a strip of sealing tape to be applied over the top edges of each flattened bag top just prior to stitching together the bag top walls, the operator selects a circuit for sewing head 163. He next depresses foot pedal 98 which is provided with a switch (not shown) which interrupts the supply of electric current to the conveyor motor 38, which stops the conveyor belt. Such interruption of the supply of current to the conveyor motor 38 is effected through a magnetic starter of well known construction, not shown.

Depression of foot pedal 98 moves the terminal 105 of arm 103 into engagement with the stud or projection 106 on the scale platform 50, and thereby moves the scale platform to its depressed or lowered position, shown in Figure 5, whereby the filled bag is delivered onto the conveyor. At the same time, the latch 87, by the action of spring 95, is moved into locking engagement with the cross rod 97 of the scale beams 69, and thereby secures the weighing platform 50 in its depressed position, shown in Figure 5. The bag is then momentarily supported on the interrupted conveyor during which period the operator may manually condition the bag top for closing.

When the bag top walls have been brought into flatwise relation, the operator releases the foot pedal 98, to start motor 38 and the conveyor 5. As the conveyor resumes operation, the bag is advanced to sewing head 163.

When textile bags are to be filled and closed, the operator selects a circuit to energize sewing head 162. As soon as the shortweight bag is delivered onto the conveyor from the packer at station A, the conveyor transfers the bag to station B where the troughs 107 and 108 of the check weigher deliver the necessary material into the shortweight bag to bring its contents up to full weight. The bag top is then manually fed through sewing head 162 and the bag top closed.

The foregoing detailed description has been given for clearness of understanding only, and no unnecessary limitations should be understood therefrom, and the appended claims should be construed as broadly as permissible in view of the prior art.

What I claim is:

1. In an apparatus of the class described, a horizontal conveyor for bags comprising a plurality of V-belts supported on V-pulleys, said pulleys and belts being positioned so that said belts travel at the same speed and parallel to each other, said belts being arranged so that in cross-section the belts form a trough with edge belts higher than central belts for supporting the bottom of the bag, said belts being supported by guides between said pulleys to maintain the conveyor travel portion thereof along a fixed path, a filling device disposed over said conveyor, cradle means for lifting each bag off the conveyor as the bags successively reach a position beneath said filling device whereby each bag is supported independently of the conveyor during the completion of the filling operation and means for returning the cradle to its inoperative position beneath the conveyor whereby the filled bag is delivered on the conveyor to be transported thereby to a succeeding station.

2. In an apparatus of the class described, a horizontal conveyor for bags comprising a plurality of V-belts supported on V-pulleys, said pulleys and belts being positioned so that said belts travel at the same speed and parallel to each other, said belts being arranged so that in cross-section the belts form a trough with edge belts higher than central belts for supporting the bottom of the bag, said belts being supported by guides between said pulleys to maintain the conveyor travel portion thereof along a fixed path, a filling device disposed over said conveyor, a cradle mounted for vertical movement between said belt runs, means for actuating said cradle to lift each bag off the conveyor as the bags successively reach a position beneath said filling device whereby each bag is supported on the cradle independently of the conveyor during the completion of the filling operation and means for returning the cradle to its inoperative position beneath the conveyor whereby the filled bag is delivered on the conveyor to be transported thereby to a succeeding station.

3. In an apparatus of the class described, a horizontal conveyor comprising a plurality of spaced parallel endless belts, the upper runs of which cooperate to provide a load-carrying surface, a cradle mounted for vertical movement between said belt runs and adapted to be positioned beneath the carrying surface of the conveyor, a filling device disposed over the conveyor and said cradle, means for actuating the cradle to lift each bag off the conveyor as the bags successively reach a position beneath the filling device, and whereby each bag is supported on the cradle independently of the conveyor during the completion of the filling operation, and means for returning the cradle to its inoperative position beneath the conveyor, whereby the filled bag is delivered onto the conveyor to be transported thereby to a succeeding station.

4. An apparatus according to claim 3, wherein the load-engaging portion of the cradle comprises a plurality of elongated laterally spaced elements mounted for up and down movement between adjacent belt runs.

5. In an apparatus of the class described, a horizontal conveyor comprising a plurality of spaced parallel V-belts, the upper runs of which cooperate to provide a load-carrying surface of the conveyor, a bag filling station including a cradle normally disposed beneath the load-carrying surface of the conveyor and having a bag filling device disposed thereover for introducing a predetermined charge into each bag positioned therebeneath, means for elevating the cradle to temporarily lift each bag off the conveyor during the completion of the filling operation, and manual means positioned for operator actuation for returning the cradle to its normal inoperative position beneath the conveyor, when the bag supported thereon has received its full charge, thereby to deliver the filled bag onto the conveyor for delivery to a succeeding station.

6. In an apparatus of the class described, a horizontally disposed conveyor composed of a plurality of spaced parallel V-belts, the upper runs of which cooperate to provide a load-carrying surface, the outer runs of said V-belts being disposed at a higher elevation than the intermediate belt runs, whereby the cross sectional contour of the load-carrying surface of the conveyor is concave, thereby to substantially coincide with the curvature of the bottoms of the bags to be transported thereon, a bag filling device over the conveyor, a cradle mounted directly below the bag filling device and normally positioned beneath the load-carrying surface of the conveyor and being vertically movable between adjacent belt runs, means for elevating the cradle to momentarily lift each bag off the conveyor as the bags successively reach a position beneath the filling device, and whereby each bag is supported on the cradle independently of the conveyor during the completion of the filling operation, and means for returning the cradle to its inoperative position beneath the carrying surface of the conveyor, thereby to deliver the filled bag onto the conveyor for delivery to a succeeding station.

7. An apparatus according to claim 6, wherein a scale beam is provided for supporting the cradle thereon.

8. A conveyor comprising a plurality of belt members, said belt members being disposed in parallel spaced relation to form an extended conveying surface, pulley means supporting said belt members at each end, said pulley means at one end comprising a plurality of offset pulleys of substantially equal diameter with edge pulleys higher than central pulleys so that said belt members in cross section form a trough with edge belts higher than central belts, said pulley means at the other end of the belt members comprising co-axial pulleys secured to a common shaft, power means for rotating said shaft, said co-axial pulleys being of substantially equal diameter whereby said belts will travel at the same speed and said belts being supported by guides between said pulley means at said ends to maintain the conveyor travel portion thereof along a fixed path, said offset pulleys being individually supported on swinging arms, and means provided to pull said arms in a direction to tighten the belts over the pulleys.

9. A conveyor comprising a plurality of belt members, said belt members being disposed in parallel spaced relation to form an extended conveying surface, pulley means supporting said belt members at each end, said pulley means at one end comprising a plurality of offset pulleys of substantially equal diameter with edge pulleys higher than central pulleys so that said belt members in cross section form a trough with edge belts higher than central belts, said pulley means at the other end of the belt members comprising co-axial pulleys, said co-axial pulleys being of substantially equal diameter whereby said belts will travel at the same speed.

10. A conveyor comprising a plurality of belt members, said belt members being disposed in parallel spaced relation to form an extended conveying surface, pulley means supporting said belt members at each end, said pulley means at one end comprising a plurality of offset pulleys of substantially equal diameter with edge pulleys higher than central pulleys so that said belt members in cross section form a trough with edge belts higher than central belts, said pulley means at the other end of the belt members comprising co-axial pulleys secured to a common shaft, power means for rotating said shaft, said co-axial pulleys being of substantially equal diameter whereby said belts will travel at the same speed and said belts being supported by guides between said pulley means at said ends to maintain the conveyor travel portion thereof along a fixed path.

References Cited in the file of this patent

UNITED STATES PATENTS

| | | |
|---|---|---|
| 636,762 | Conley | Nov. 14, 1899 |
| 870,050 | Robbins | Nov. 5, 1907 |
| 1,970,842 | Crossen | Aug. 21, 1934 |
| 2,102,248 | Yeakel | Dec. 14, 1937 |
| 2,311,706 | Sowden | Feb. 23, 1943 |
| 2,637,458 | Fahey | May 5, 1953 |